United States Patent [19]
Tamura et al.

[11] Patent Number: 5,130,804
[45] Date of Patent: Jul. 14, 1992

[54] COMPACT RECORDING APPARATUS WITH FUNCTIONAL COMPONENTS MOUNTED ON A SUBSTRATE

[75] Inventors: Tomoaki Tamura; Kazuo Shiozawa, both of Hachioji, Japan

[73] Assignee: Konica Corporation, Tokyo, Japan

[21] Appl. No.: 635,930

[22] Filed: Dec. 28, 1990

[30] Foreign Application Priority Data

Jan. 9, 1990 [JP] Japan .......................... 2-982

[51] Int. Cl.$^5$ .................. H04N 5/30; H04N 5/225
[52] U.S. Cl. ........................ 358/209; 358/225
[58] Field of Search ........... 358/209, 225, 229, 98, 358/100

[56] References Cited

U.S. PATENT DOCUMENTS

| | | | |
|---|---|---|---|
| 4,074,306 | 2/1978 | Kakinuma et al. | 128/6 |
| 4,516,157 | 5/1985 | Campbell | 358/209 |
| 4,745,470 | 5/1988 | Yabe et al. | 358/98 |
| 4,831,456 | 5/1989 | Takamura | 358/98 |
| 4,832,003 | 5/1989 | Yabe | 358/98 |
| 4,918,521 | 4/1990 | Yabe et al. | 358/98 |
| 4,992,875 | 12/1991 | Shintani et al. | 358/209 |
| 5,040,069 | 8/1991 | Matsumoto et al. | 358/213.11 |

FOREIGN PATENT DOCUMENTS

| | | | |
|---|---|---|---|
| 58-210763 | 12/1983 | Japan | 358/229 |
| 64-60070 | 3/1989 | Japan . | |
| 1-186068 | 7/1989 | Japan . | |
| 1-220979 | 9/1989 | Japan . | |
| 1-220981 | 9/1989 | Japan . | |

*Primary Examiner*—David K. Moore
*Assistant Examiner*—Wendy R. Greening
*Attorney, Agent, or Firm*—Frishauf, Holtz, Goodman & Woodward

[57] ABSTRACT

An image recording apparatus for converting a subject image to an image signal and storing the image signal in a memory. An optical unit for focusing the subject image on a focal plane is fixed to obverse surface of a circuit board concentric to an opening of the circuit board that is formed as an optical path through the depth of the circuit board, and an image sensor is fixed to reverse surface of the circuit board concentric to the opening. A sensing surface of the image sensor is directed to the optical unit and is coincident with the focal plane of the optical unit.

3 Claims, 6 Drawing Sheets

FIG. I

COMPACT RECORDING APPARATUS WITH FUNCTIONAL COMPONENTS MOUNTED ON A SUBSTRATE

BACKGROUND OF THE INVENTION

The present invention relates to an image recording apparatus such as a still video camera and a video movie, and relates more particularly to improvements in the form to mount an image sensor such as a CCD to a base such as a printed circuit board in order to make the image recording apparatus compact.

Recently, a still video camera used as an image recording apparatus and a still image playback apparatus to reproduce a recorded still image, have come into practical use, wherein the still video camera is composed in such a manner that: the optical image of a subject is formed on a solid image sensor such as a CCD by an optical photographing means of a lens, a diaphragm and the like; and the image signal outputted from the image sensor is recorded on a recording medium such as a floppy disk. (Refer to the official gazette of Japanese Patent Publication Open to Public Inspection No. 60070/1989.)

When the above-described still video camera and still image playback apparatus are used, the photographed still image can be very easily played back without being processed by the developing and fixing units which have been used to process the image taken by a conventional camera.

Lately, a still video camera in which a memory card is used has come onto the market.

In the case of the conventional still video camera, mechanical parts and electrical parts are classified into a plurality of groups so that they can be provided onto a plurality of bases.

In the above-described composition in which mechanical and electrical parts are classified into a plurality of groups so that they can be provided onto a plurality of bases, problems have been caused such as: the number of bases are increased; and a large number of connectors and soldered joints are necessary in order to connect each part, so that the number of parts is increased and further the man-hours of assembly work are also increased, resulting in higher production costs.

Since the numbers of bases and connectors are increased, the apparatus attains a large size and further the amount of electric wiring is increased. As a result, the apparatus is affected by noise, so that the reliability is lowered.

With reference to the circumstances described above, the inventors previously proposed a still video camera which is characterized in that: almost all the parts necessary for photographing and recording are mounted onto a single base, so that the number of parts and the man-hours of assembly work are reduced in order to cut down on the production cost, and to make the apparatus compact and to increase reliability. (Refer to Japanese Patent publication Open to Public Inspection No. 82230/1988.)

As explained above, the size of the apparatus is made smaller by improving the form of mounting parts to the base. However, the length of the optical system of a conventional apparatus is still long compared with the sizes of electronic parts and the recording medium.

For example, according to the official gazette of Japanese Patent Publication Open to Public Inspection No. 60070/1989, the positional relation between the optical system and the image sensor is illustrated in FIG. 11.

Specifically, CCD 41 and the lens unit 42 are provided onto one of the surfaces of the base 40.

The pin-type terminal 42 of CCD 41 is inserted into the hole 43 of the base 40 so that CCD 41 can be electrically connected with the base 40, and the light receiving surface 44 is set toward the lens 45 of the lens unit 42.

The numeral 46 represents other parts to be provided onto the upper and lower surfaces of the base 40.

However, the following problem has been caused in the structure of the conventional CCD described above.

A luminous flux of an optical image passes through the lens 45 and converges on the light receiving surface 44 so that the image can be formed. In this case, the light path between the lens 45 and the light receiving surface 44 is formed only on one side of the base surface, so that a long distance is necessary on one side of the surface of the base 40. Specifically, distance L in FIG. 11, which is the minimum length needed for a camera, is likely to be longer.

For that reason, the camera body necessarily becomes thick, so that it is difficult to make the camera body compact in this type of camera.

The object of the present invention is to provide a camera, in which the image sensor, such as a CCD, is provided to the base in an improved manner so that the image recording apparatus can be made compact, in order to solve the problems in the conventional camera described above.

SUMMARY OF THE INVENTION

The present invention is to provide an image recording apparatus in which the optical image of a subject is formed on an image sensor by an optical photographing means, and the image signal outputted from the image sensor is recorded in a recording medium, and which image recording apparatus is characterized in that: a base is provided onto which mechanical and electrical parts are provided for photographing and recording; the above-described image sensor is mounted on the base surface opposite to the surface on which the above-described optical photographing means is provided, wherein the light receiving surface of the above-described image sensor is set toward the base surface; and an opening is provided to the base, wherein the light path between the above-described optical photographing means and the above-described light receiving surface passes through the opening.

In the apparatus described above, the optical path is formed on two sides of the base, one is the side on which the optical photographing means is provided and the other is the opposite side, so that the length of the optical path on the side of the optical photographing means of the base can be shortened. As a result, the apparatus can be made thinner than conventionally, in other words the apparatus can be made more compact.

DETAILED DESCRIPTION OF THE PREFERRED EMBODIMENT

Figure 1:
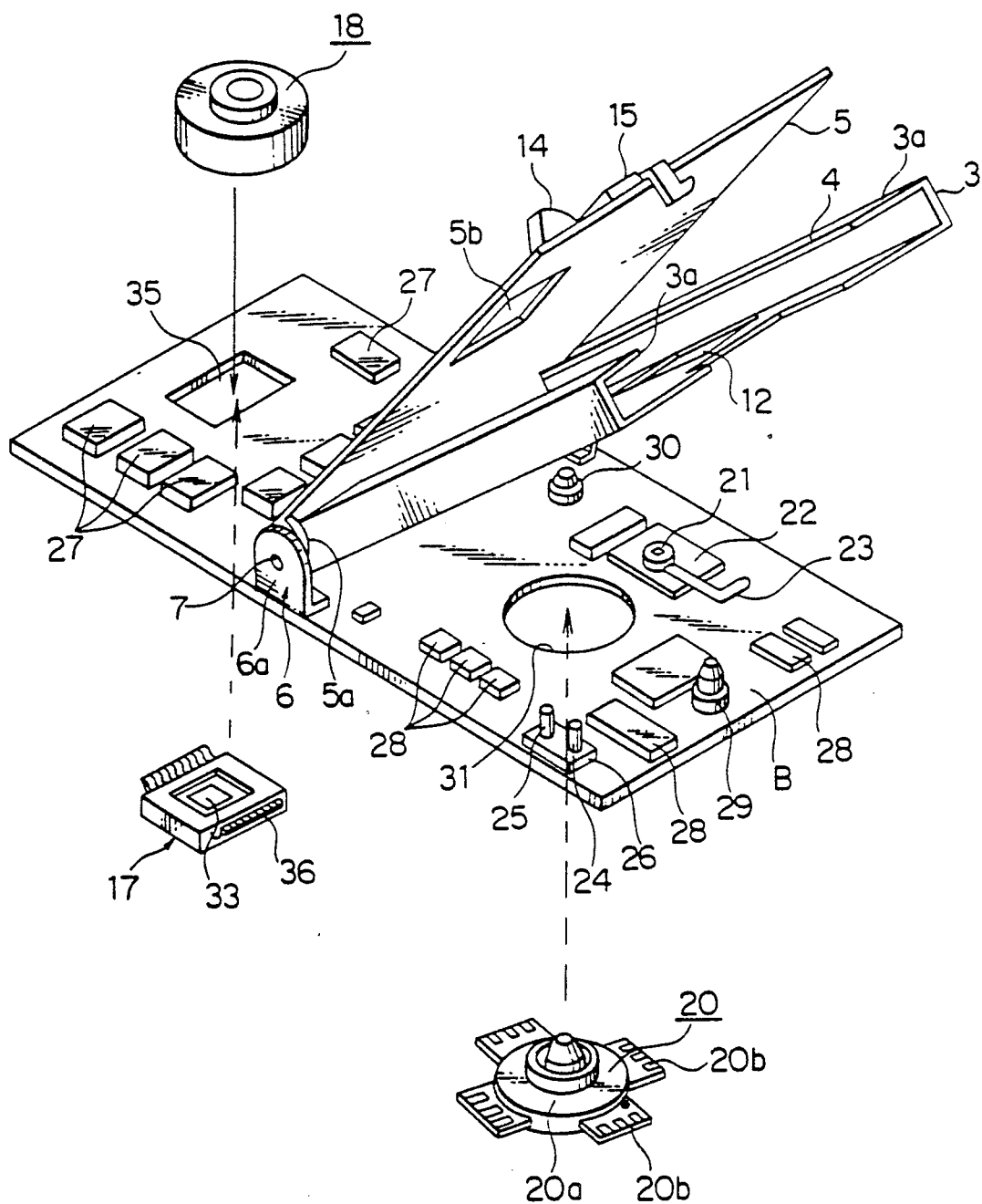
FIG. 1 is an exploded perspective view showing the base structure of an example of the image recording apparatus embodying the present invention.
Figure 2:
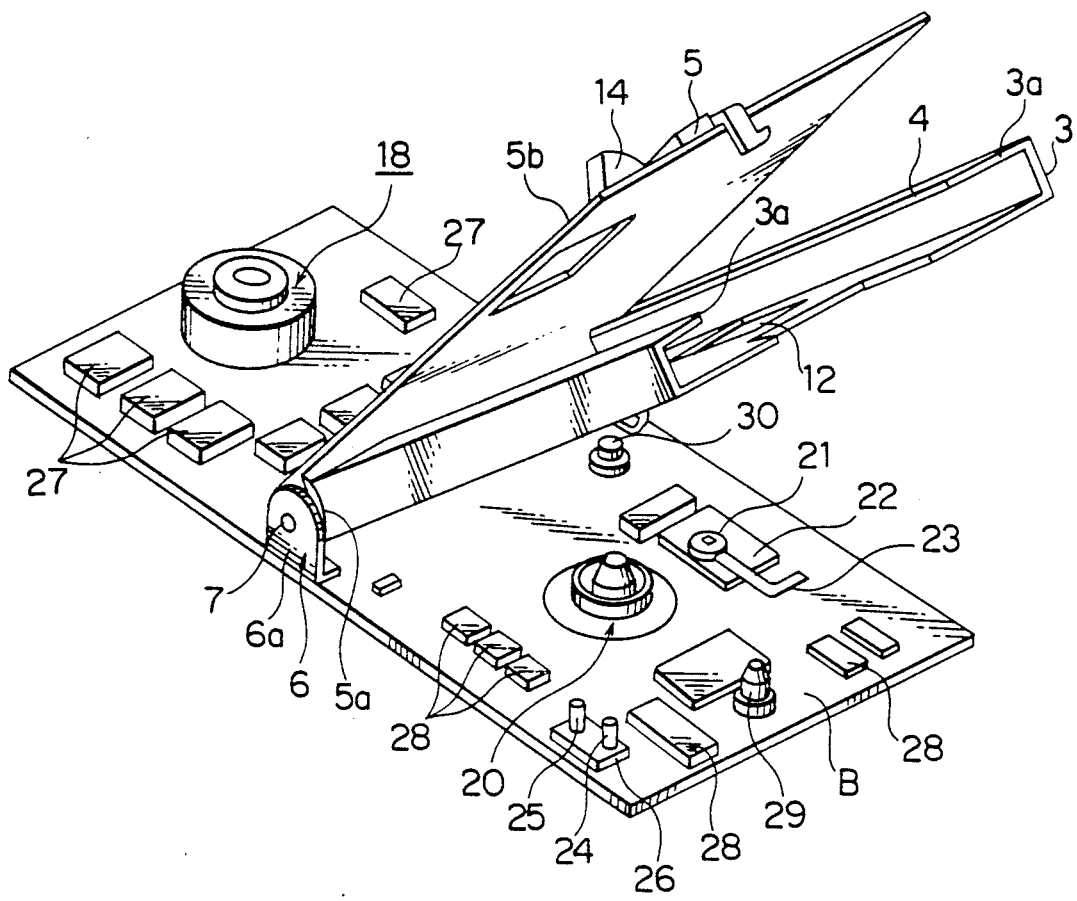
FIG. 2 is an assembled perspective view showing the base structure of the above-described example.
Figure 3:
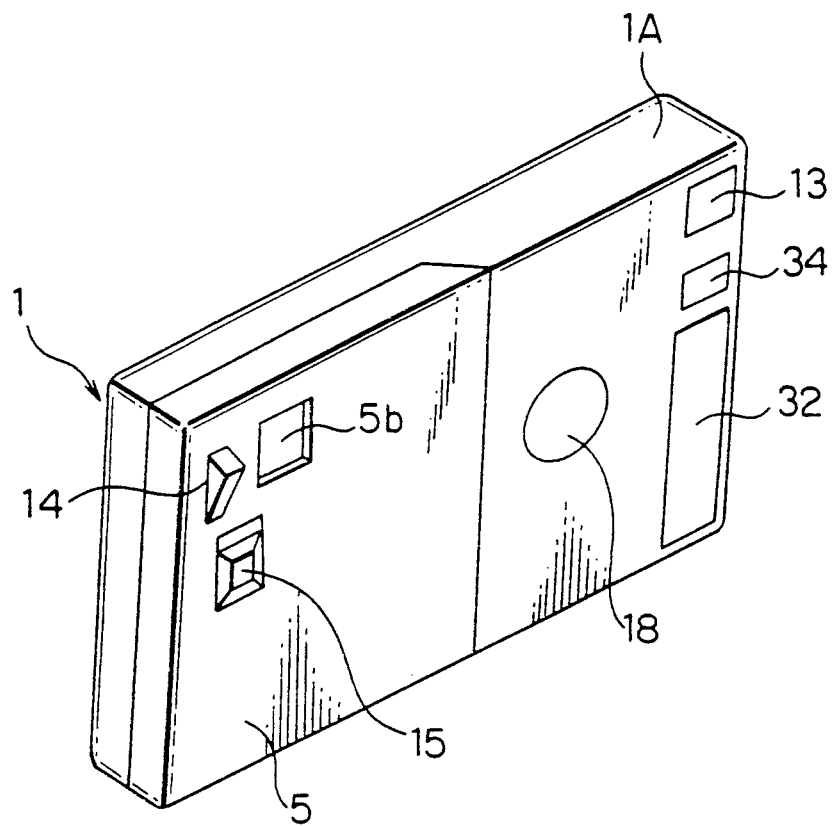
FIG. 3 is a perspective view showing the camera body of the above-described example.

In FIG. 1 to FIG. 3, base B is provided inside the main body case 1A of the still video camera 1. Almost all of the mechanical and electrical parts necessary for photographing and recording are provided on base B.

Base B is rectangular. The support member 6 rotatably supporting the holder 3 for use in a still video floppy disk not illustrated in the drawing and the floppy disk drive cover 5 which opens and closes the window portion 4 of the holder 3, is fixed to the middle portion of base B in the longitudinal direction.

The support pieces 6a are provided to both edge portions of the above-described support member 6 which is composed of an approximately C-shaped member. Two support pieces 6a are laterally aligned with regard to the base B so that they can be faced with each other.

The above-described holder 3, which has a U-shaped section, the upper side of which is open, is provided with the flange portions 3a which are protruded from the edge portions opposite to each other. One end of the holder 3 is rotatably supported by the support members 6a through the hinges 7.

The bottom portion of the holder 3 is provided with an opening for the reading/writing head of a still video floppy, a window for use in motor drive, and a window portion 12 which is used so that a datum hole and a claw to prevent unintentional erasing can face the upper side of base B.

The above-described floppy drive cover 5 is composed of a flat plate member, and the support members 5a which are rotatably supported by the above-described support members 6a through the hinges 7.

The release button for photographing use 14 and the ejecting button 15 for opening and closing the floppy drive cover 5, which are illustrated in FIG. 3, are provided on the upper surface of the floppy drive cover 5.

A portion of the electrical circuit or all of the electrical circuit necessary for the above-described release button 14 for photographing use may be provided on the upper surface of the floppy drive cover 5.

The circuit necessary for the release button 14 and a PG coil for detecting the rotation of the still video floppy are connected with base B through a flexible base so that the floppy drive cover 5 can be rotated.

Further, the floppy drive cover 5 is provided with the see-through window 5b to check the existence of a floppy disk in the holder 3.

CCD 17, a solid image sensor is mounted on the lower surface of base B. The lens unit 18 which is an optical means to form an optical image on CCD 17, and a plurality of electronic parts are provided at the position on the upper surface of base B corresponding to CCD 17.

Mounting manner of CCD 17 and the lens unit 18 will be described in detail later.

The upper surface of base B is provided with: the drive motor 20 to drive a still video floppy; the reading/writing head 21 which reads and writes image data on a still video floppy; the head tracking unit 22 of a linear motor type, which may be of the type in which a stepping motor and a lead screw are combined; the flexible print circuit board for signal lead wires connected with the above-described head 21; the unit 26 to which the floppy detecting switch 24 and the above-described unintentional erasing preventing detection switch 25 are provided; and a plurality of electronic parts 28. Further the positioning pins 29,30 of the above-described holder 3 are provided to the upper surface of base B.

As illustrated in FIG. 1, the above-described motor 20 used for driving a still video floppy is provided with a plurality of terminals 20b which are horizontally protruded from the outer circumferential surface of the motor body 20a. The motor 20 is provided to base B in such a manner that: the motor body 20a is inserted from the lower side of base B into the circular opening 31 formed on base B so that the motor body 20a can be protruded from the upper surface of base B. Then, the above-described terminals 20b are soldered to the lower surface of base B.

One positioning pin 30 is arranged at the position on base B close to the above-described support member 6 and the other positioning pin 29 is arranged at the position on base B close to the edge portion. The above-described holder 3 is engaged with the pins 29,30 so that a predetermined gap can be made between the holder 3 and base B.

As illustrated in FIG. 3, a built-in battery 32, which is either exchangeable or no-exchangeable, is provided inside the body case 1A.

Figure 4:
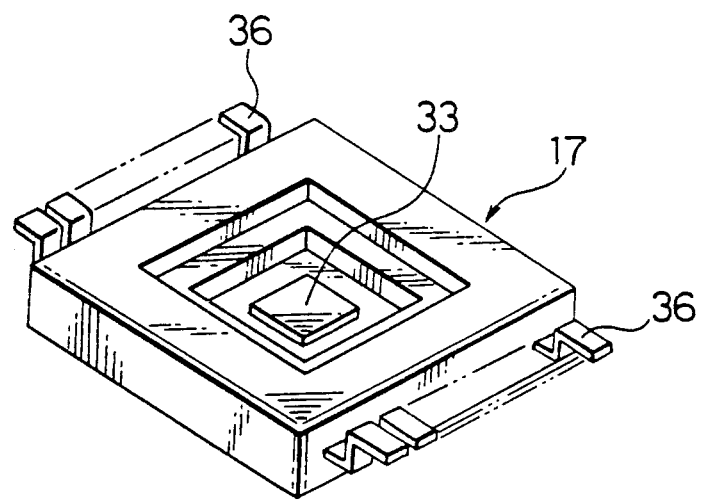
FIG. 4 is a perspective view of a CCD which is used in the above-described example.
Figure 5:
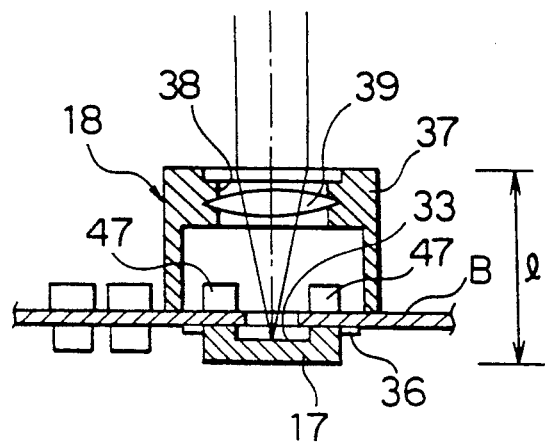
FIG. 5 is a sectional view showing the form to provide a lens unit and a CCD onto the base.

Referring now to FIGS. 3-5, the form of providing the CCD 17 and the lens unit 18 will be explained in detail as follows.

As illustrated in FIG. 5, CCD 5 is provided on the lower surface of base B in such a manner that the light receiving surface 33 can face the lower surface of base B. The square opening 35 is formed at the position on base B corresponding to the light receiving surface 33. CCD 17 is of the surface providing type. As illustrated in FIG. 4, CCD 17 has a plurality of terminals 36 which are protruded from opposite sides of CCD 17. These terminals 36 are soldered to the lower surface of base B so that the terminals 36 can be electrically connected with base B. In other words, the CCD 17 is mounted on the surface of base B.

The lens unit 18 is composed of the lens-barrel 37 and a group of lenses 39 which are provided inside the lens-barrel 37 so that the peripheral portion of the lens group is held by the inner circumferential surface of the opening 38 formed at the upper end of the lens-barrel 37.

A beam of light incident upon a group of lenses 39 through the opening 38 is converged. After that, the beam of light passes through the opening 35 formed on base B and projected on the light receiving surface 33 so that the optical image can be formed on the light receiving surface 33.

In FIG. 3, the numeral 13 is a viewfinder and the numeral 34 is a strobe light.

In the still video camera explained above, CCD 17 is provided on the surface of base B opposite to the surface on which the lens unit is provided in such a manner that the light receiving surface 33 of CCD 17 can face base B, and the opening 35 is provided on base B so that a light path connecting the lens unit 18 with the light receiving surface 33 can be formed. Consequently, a light path is formed not only on the upper side of base B but also on the lower side, so that the length of the light path on the upper side of base B can be shortened. Accordingly, the minimum length necessary for a camera, represented by 1 in the drawing, can be shortened compared with a camera in which the light path is formed only on one side of base B.

Therefore, the thickness of a camera body can be reduced as compared with a conventional camera, so that it is possible to make a camera compact in size.

Further, no parts are provided in the space encircled by the lens-barrel 37 of the lens unit 18 in this case, so that other parts 47 can be provided in the above-described space. As a result, the effective area of base B which can be used to provide necessary parts can be increased.

Figure 11:
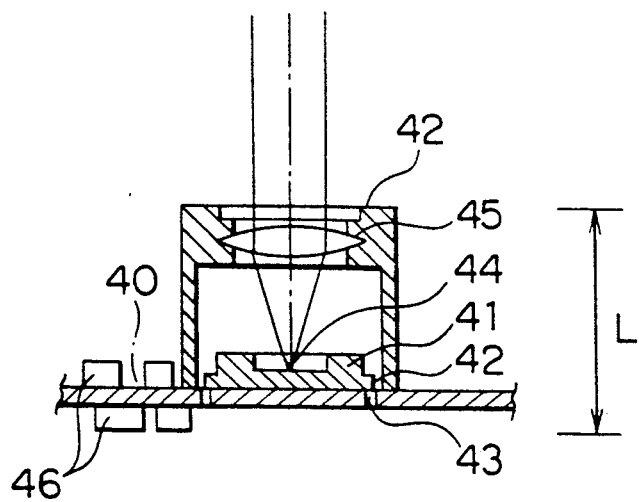
FIG. 11 is a sectional view showing the form to provide a lens unit and CCD to the base in a conventional (prior art) apparatus.

In the case explained above, CCD 17 is provided on the lower surface of base B, so that other parts can not be provided in the space on the lower surface where CCD 17 is arranged. However, as illustrated in FIG. 11, even in the case of a conventional example, the terminal of the CCD is protruded from the lower surface of base B, so that this portion can not be used for wiring or providing parts. In the still video camera of this example, the effective area on base B is approximately the same as that of a conventional example.

Further, in this example, the motor 20 for driving a still video floppy is of the surface providing type and the motor 20 is provided on the surface of base B in such a manner that: the motor body 20 is inserted upwardly into the circular opening 31 which is formed on base B so that the motor body is protruded to the upper surface of base B; and the terminals 20b are soldered to the lower surface of base B. Accordingly, the thickness of the camera body can be reduced at the portion in which the motor 20 is provided and the camera of the invention can be further made compact.

Figure 6:
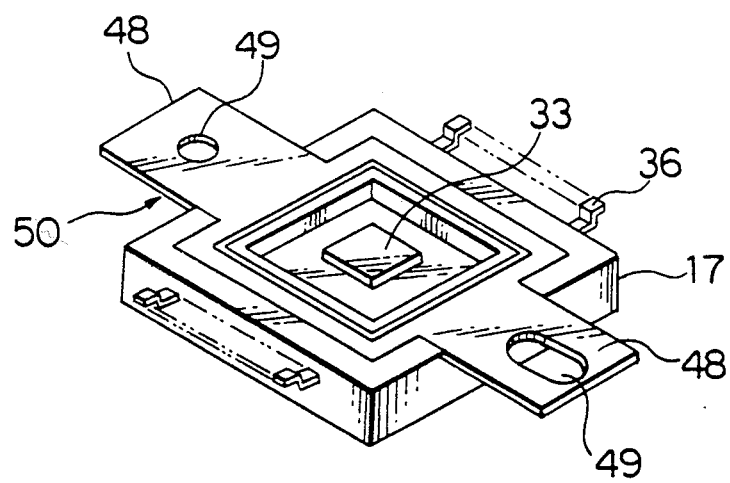
FIG. 6 and FIG. 7 are perspective views of a CCD of another example.
Figure 7:
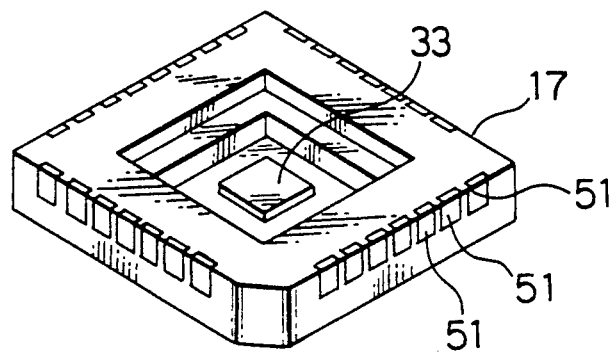

Other than the CCD illustrated in FIG. 4, CCDs illustrated in FIG. 6 and FIG. 7 may be applied to the still video camera of the present invention.

In the case of CCD 17 illustrated in FIG. 6, the protrusions 48 which are protruded from CCD17 in opposite directions, are provided, wherein the hole 49 for use in positioning is formed on the protrusion 48.

In the case of CCD 17 described above, it is advantageous that the accuracy of optical positioning can be improved.

In FIG. 7, there is shown a version of CCD 17 in which four side surfaces are provided with a plurality of flat type terminals 51. The CCD 17 explained above has an advantage in that the soldering area needed to mount CCD 17 on base B can be reduced so that CCD 17 can be mounted on a smaller space on base B than CCDs 17 illustrated in FIG. 4 and FIG. 6.

The surface mounting type CCDs 17 are adopted to the examples described above. The CCD 17 which is mounted with pin type terminals may be used.

Figure 8:
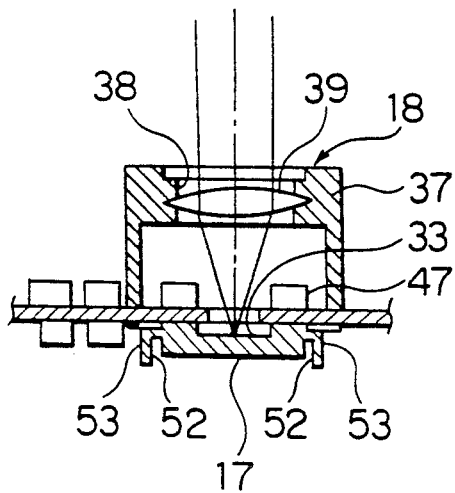
FIG. 8 is a sectional view showing the form to provide a lens unit and a CCD of another example.

As illustrated in FIG. 8, in the case of CCD 17 mounted with pin type terminals, the pin type terminals 52 protruded from the outer circumferential surface of CCD 17 are electrically connected with the lower surface of base B through the wiring parts 53.

When the composition of the above-described examples is practically applied, base B can be made from a metal plate so that the electrical circuit can be easily provided to the surface of the base and the accuracy of the optical system can be improved and further the mechanical strength of the base and the circuit can be guaranteed. Therefore, the thickness of the body case lA can be reduced.

Figure 9:
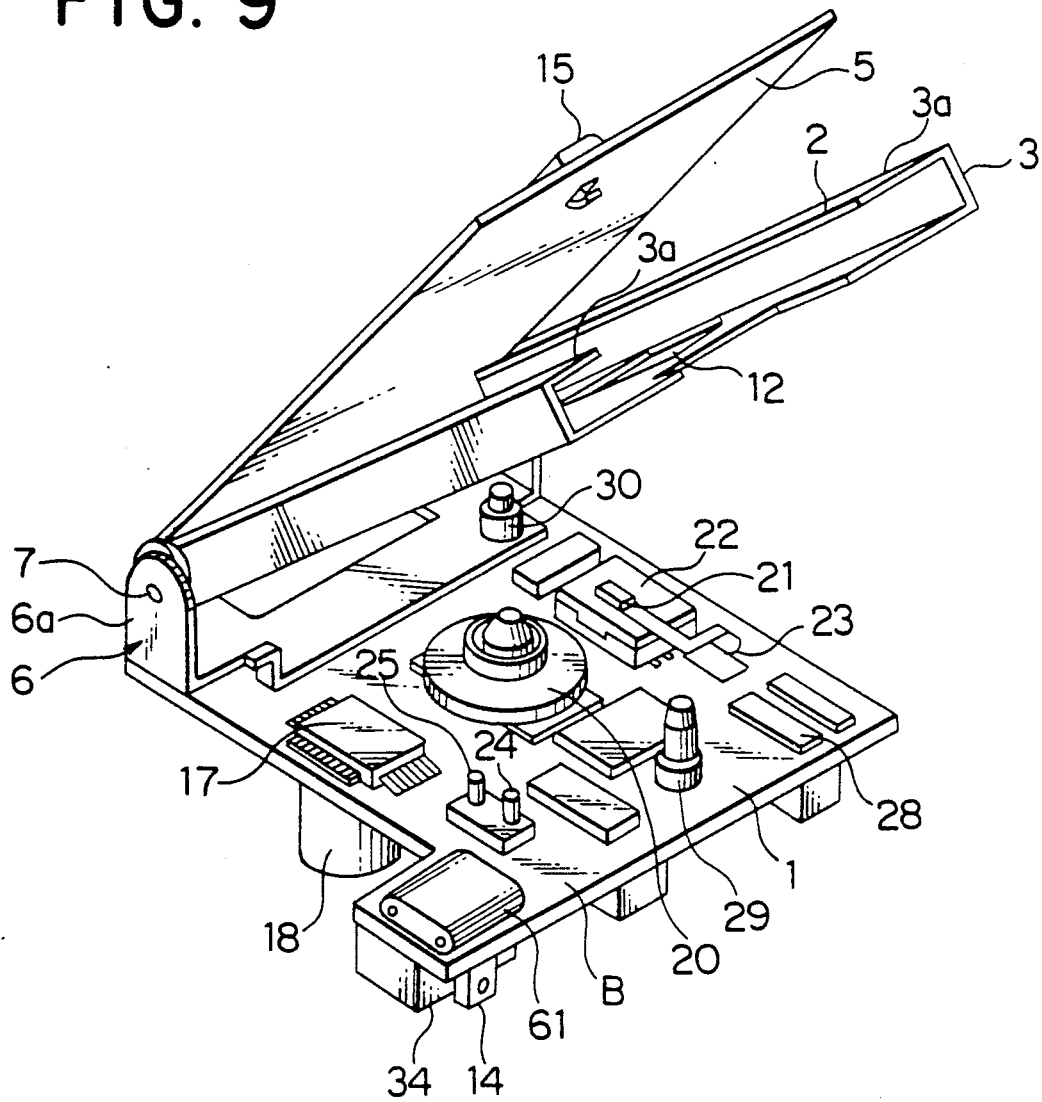
FIG. 9 is a perspective view showing the structure of an assembled base of another example.
Figure 10:
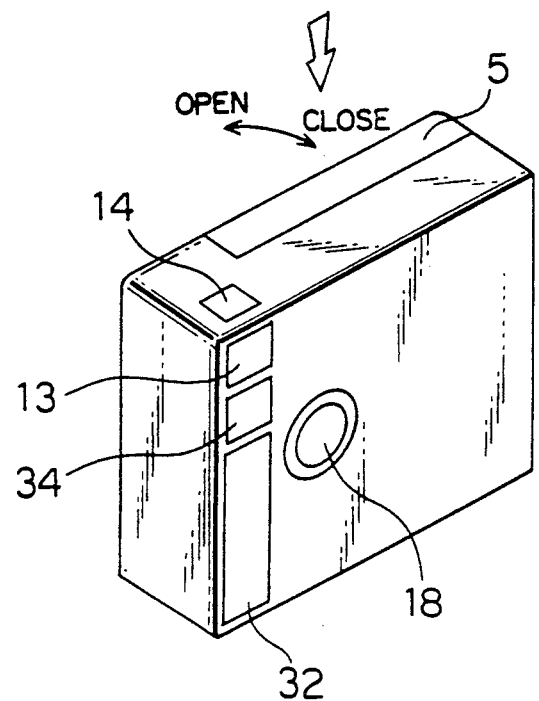
FIG. 10 is a perspective view showing a camera body of another example.

Next, another example is shown in FIG. 9 and FIG. 10.

In this example, mechanical parts and electrical parts are provided on the lower surface of base B in order to increase the degree of accumulation of parts on base B so that the size of base B can be reduced.

In this case, the support member 6 is fixed to base B, the size of which is half the size of base B illustrated in FIG. 1, and CCD 17 is provided on the upper surface of base B. The lens unit 18 is provided to a position on the lower surface of base B, reciprocal to the position of CCD 17 mounted on the upper surface.

CCD 17 is mounted in such a way that the receiving surface faces the upper surface of base B. In the same way as the example illustrated in FIG. 1, a square opening is formed on base B reciprocally to the light receiving surface of CCD 17. CCD 17 in this case is of the surface mounting type.

In this example, the lens unit 18 is provided upwardly on the lower surface of base B.

Further, the condenser 61 for the strobe light is provided on the upper surface of base B and the release button 14 and the strobe light 34 are provided on the lower surface of base B.

As illustrated in FIG. 10, in the example having the composition described above, the size of a camera body can be reduced to the size of a floppy disk jacket.

In the examples described above, the forms to provide CCD 17, which is a solid image sensor, have been explained. The forms explained above can be applied not only to solid image sensors but also to light receiving elements such as photometry elements, A/F elements, and auto white elements.

The recording medium is not limited to magnetic floppy disks. Memory cards may be used.

As explained above, the following effects can be provided according to the present invention.

An image recording apparatus can be provided in which the optical image of a subject is formed on an image sensor by an optical photographing means, and the image signal outputted from the image sensor is recorded in a recording medium, and which image recording apparatus is characterized in that: the image sensor is mounted on the base surface opposite to the surface on which the optical photographing means is provided, wherein the light receiving surface of the above-described image sensor is set toward the base surface; and an opening is provided to the base, wherein the light path between the above-described optical photographing means and the above-described light receiving surface passes through the opening.

In the apparatus described above, the optical path is formed on two sides of the base, one is the side on which the optical photographing means is provided and the other is the opposite side, so that the length of the optical path on the side of the optical photographing means of the base can be shortened. As a result, the thickness of the apparatus can be made thinner than conventionally, in other words the apparatus can be made more compact.

What is claimed is:

1. A compact image recording apparatus, comprising:

image sensing means comprising a plurality of components for generating an image signal by sensing an optical image formed on a surface thereof;

optical means comprising a plurality of components for forming an optical image of a subject on the surface of the image sensing means;

memory means comprising a plurality of components for memorizing the optical image of the subject by receiving the image signal from the image sensing means;

substrate means having first and second opposite surfaces for mounting a plurality of functional components of the compact image recording apparatus on the first and second surfaces, said functional components including the pluralities of components of the image sensing means, the optical means, the memory means as well as a plurality of mechanical components and a plurality of electrical components except at least one manually operable switch;

an optical path provided through the first and second surfaces of the substrate means; and wherein the optical means is mounted concentrically about the optical path on one of the first and second surfaces of the substrate means, and the image sensing means is mounted concentrically about the optical path on the other of the first and second surfaces of the substrate means.

2. The compact image recording apparatus according to claim 1, wherein the memory means comprises:

holding means for holding therein a still video floppy disk; and driving means for driving the still video disk in the holding means to record the optical image in the still video floppy disk.

3. The compact recording apparatus according to claim 2, wherein an edge portion of the holding means is fixed to the substrate means with a hinge so that the holding means is rotatable about the hinge from a first position parallel to a selected one of the first and second surfaces of the substrate means where the optical image of the subject is memorized, to a second position that is oblique to the surface of the selected one of the first and second surfaces of the substrate means, said second position enabling detachment of the still video floppy disk from the image recording apparatus.

* * * * *